No. 628,037. Patented July 4, 1899.
J. RIDGE, T. MUTTON & H. E. HUPTON.
APPARATUS FOR INDICATING AND REGISTERING DISTANCE, &c.
(Application filed Feb. 16, 1898.)
(No Model.) 3 Sheets—Sheet 1.
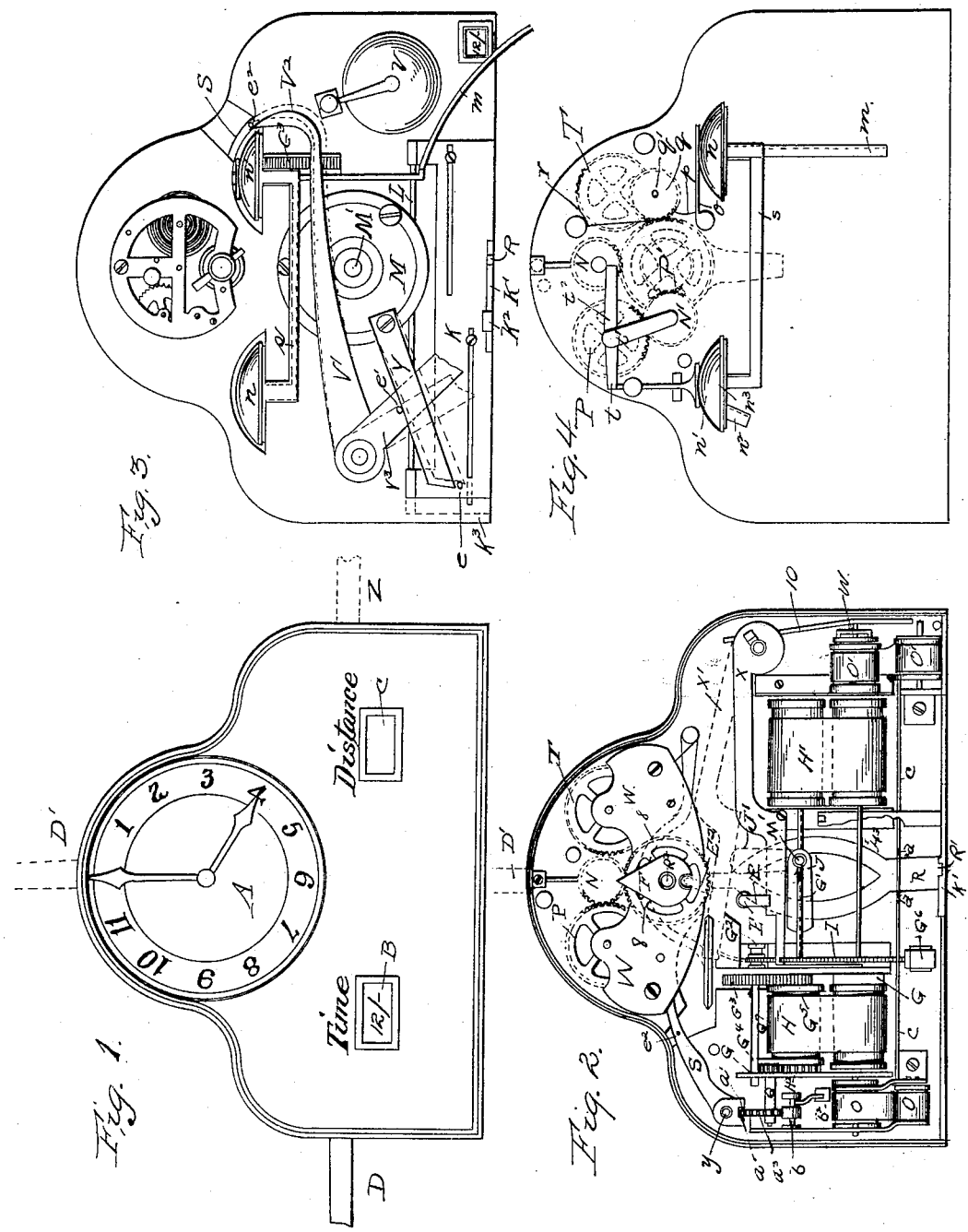
Witnesses:
L. B. Middleton
C. S. Middleton
Inventors:
James Ridge
Thomas Mutton
Horace Edwin Hupton
by Richards & Co
Attys.

No. 628,037. Patented July 4, 1899.
J. RIDGE, T. MUTTON & H. E. HUPTON.
APPARATUS FOR INDICATING AND REGISTERING DISTANCE, &c.
(Application filed Feb. 16, 1898.)
(No Model.) 3 Sheets—Sheet 2.
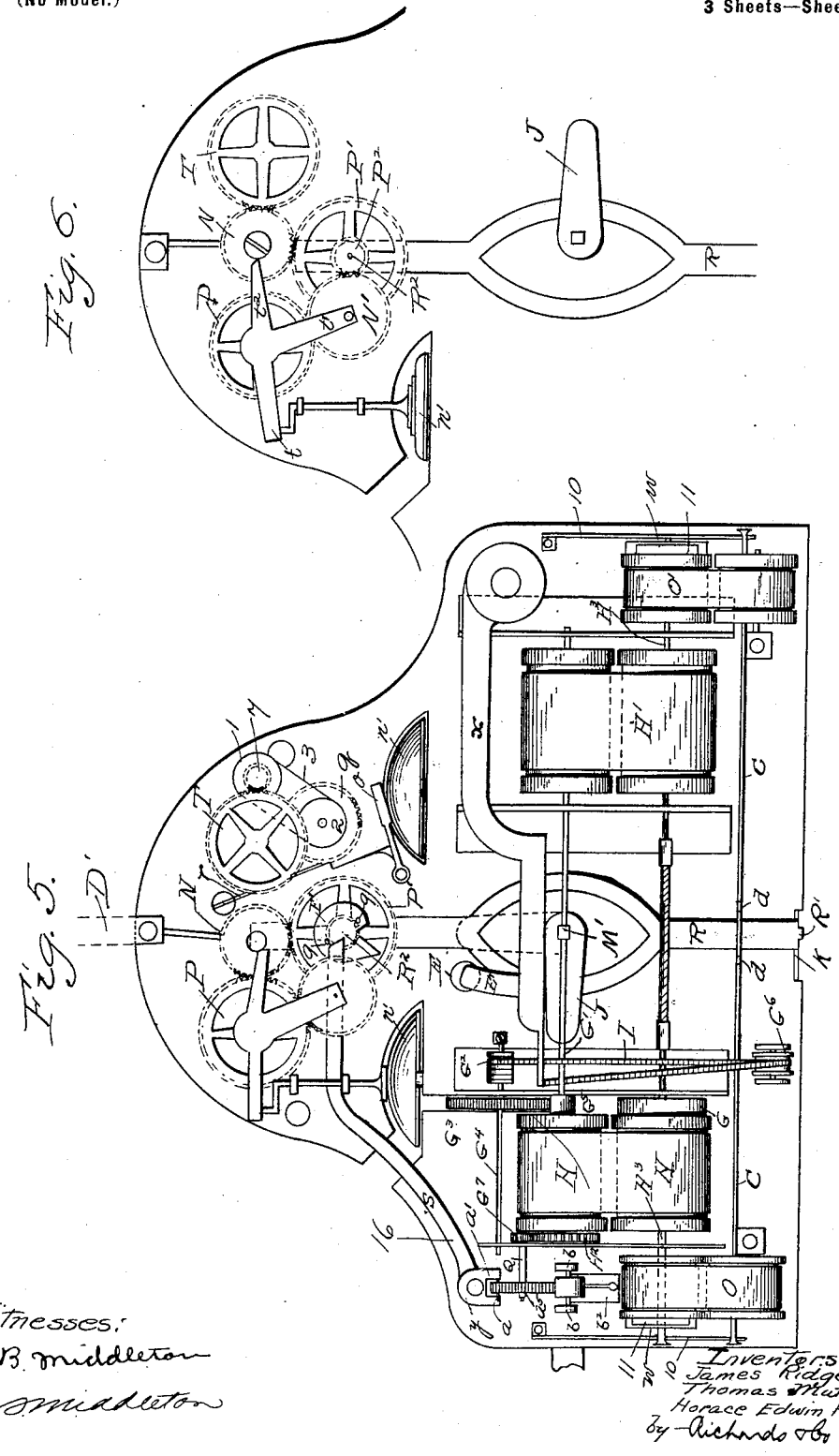
Witnesses:
L. B. Middleton
C. S. Middleton
Inventors
James Ridge
Thomas Mutton
Horace Edwin Hupton
by Richards & Co.
Attys No. 628,037. Patented July 4, 1899.
J. RIDGE, T. MUTTON & H. E. HUPTON.
APPARATUS FOR INDICATING AND REGISTERING DISTANCE, &c.
(Application filed Feb. 16, 1898.)
(No Model.) 3 Sheets—Sheet 3.
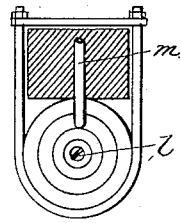
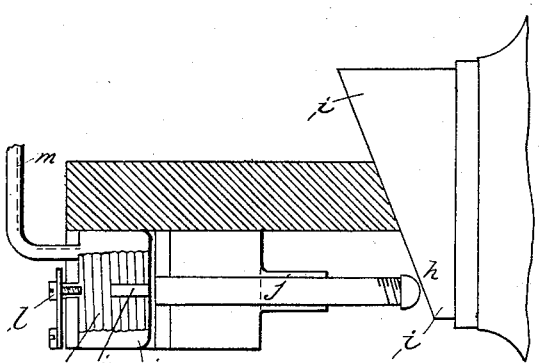
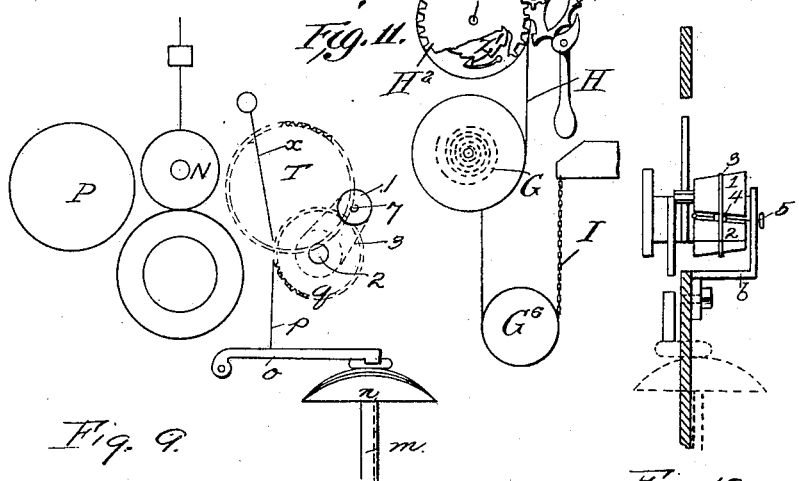
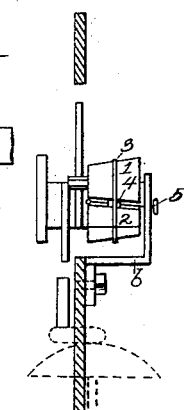
Witnesses.
L. B. Middleton
C. S. Middleton
Inventors.
James Ridge
Thomas Mutton
Horace Edwin Hupton
By Richards & Co.
Attys.

UNITED STATES PATENT OFFICE.

JAMES RIDGE, OF SELBORNE HASSOCKS, AND THOMAS MUTTON AND HORACE EDWIN HUPTON, OF BRIGHTON, ENGLAND.

APPARATUS FOR INDICATING AND REGISTERING DISTANCE, &c.

SPECIFICATION forming part of Letters Patent No. 628,037, dated July 4, 1899.

Application filed February 16, 1898. Serial No. 670,496. (No model.)

*To all whom it may concern:*

Be it known that we, JAMES RIDGE, residing at Selborne Hassocks, in the county of Sussex, and THOMAS MUTTON, residing at Kings road, and HORACE EDWIN HUPTON, residing at Farm Road Hove, Brighton, England, subjects of the Queen of Great Britain, have invented new and useful Improvements in Apparatus for Indicating and Registering Distance, Time, and Fare for Cabs, Motor-Cars, and other Vehicles, of which the following is a specification.

Our invention relates to apparatus to be applied to cabs, motor-cars, delivery-vans, and other vehicles for indicating or registering the distance traveled, the time occupied, and the amount of fare to be paid, also registering the amount of the fares taken during the day, the distance and duration of time of each journey, and the number of miles traversed during the day, thus indicating to the passenger the exact amount of the fare chargeable and preventing fraud and overcharge on the part of the driver and giving to the owner of the vehicle a reliable knowledge of the amount and nature of the business transacted during the day.

The apparatus is composed of two machines, one acted upon by the wheel of the vehicle and transmitting pneumatic pressure to the other, which is placed in a convenient situation within or upon the vehicle and being the indicator. This indicator is operated by means of a cam fixed upon one of the wheels of the vehicle, which in revolving with the wheel presses against the piston of a pneumatic pump and forces a small quantity of air into an elastic air-chamber contained in the interior of the indicator, the communication being made by means of a tube, preferably an india-rubber tube incased in metal, passing underneath the body of the vehicle or otherwise more or less hidden from sight.

The indicator is composed of an ordinary clock-movement as an indicator of time, and when acting as an indicator of distance it is brought into communication with a suitable arrangement of pinion-wheels and such like mechanism hereinafter described. The mechanism is contained in a case having an opening in the front and exposing a dial divided as a clock-face, with hands answering to the hour and minute hands of an ordinary clock and two other openings or wickets, one to expose the fares chargeable for distance traveled and the other the fares chargeable for time. When the vehicle is engaged by any person, the driver has to open one of the two wickets, indicating either time or distance, according to the wish of the hirer, and this is done by the action of a lever under the control of the driver alone. This being done, a bell rings. At the same time in one or the other of the wickets is exhibited to the passenger the amount due for the first mile or first half-hour. Shortly before the arrival at every succeeding half-mile or half-hour the bell again rings, giving warning of the advance in the fare due for a further distance or time, the mechanism causing to be exposed to view a change in the amount.

If the hirer engaging the vehicle by distance should desire to break his journey, say, for half an hour, more or less, the apparatus is so constructed that five minutes is allowed him without further charge; but at the expiration of that time an automatic arrangement is brought into action and the price of hire continues to increase as though he were traveling at the rate of four or five miles an hour. After the hiring has ceased the driver operates his lever to close the wickets and shows the vehicle is disengaged. This action at the same time places the hands of the indicator at zero, and the vehicle is ready for a fresh engagement.

When the vehicle is engaged by distance, the clock-face of the indicator is used as a measure of miles up to twelve, (which number of course may be repeated,) the short hand indicating miles and the long hand fractions of miles.

When the vehicle is engaged by time, the face represents an ordinary clock and the hands indicate, respectively, hours and minutes.

The amount of the fares for the hire, either by distance or time, are printed upon tapes, each carried upon a pair of wheels or rollers, the mechanism when brought into action causing the tapes to travel at the required point of time from one roller to the other and expose the change of fare at the wickets, as above described. The mechanism also sets in action two other pairs of rollers carrying tapes, both tapes printed with fares. These records are intended for the owner of the vehicle alone and are not exposed to the view of the driver or hirer nor are they under the control of the driver nor affected by the action of the lever, but are under lock and key and continue the full record until referred to by the owner and reset to starting-point by him.

Referring to the accompanying drawings, Figure 1 is a front view of the case of the apparatus, showing the dial indicating a hire by time and the amount of the fare due. Fig. 2 is a view of the mechanism in same position as for Fig. 1, shown with the front of case removed. Fig. 3 is a back view of the mechanism. Fig. 4 is a view of the automatic apparatus for regulating the fare while the vehicle is stationary when on hire. Fig. 5 is drawn to a larger scale than the above-named figures and is the same view as Fig. 2, but with the plate W, cam F, and the hour-wheel 8 removed in order to expose other parts. Fig. 6 shows the position of some of the mechanism when setting the apparatus to register fare by distance. Fig. 7 is an end view of the pneumatic pump, and Fig. 8 a sectional view of same. Figs. 9 and 10 are details to illustrate the means of adjusting the mechanism to the various diameters of the wheels of the vehicles. Fig. 11 is a detail illustrating the pawl-and-ratchet mechanism.

We will now describe the working of the indicator.

A, Fig. 1, is an ordinary clock-dial, B a wicket exposing the amount of fare when hiring by time, and C a wicket exposing the amount of fare when hiring by distance. D is the lever, under the control of the driver. This lever D is upright at D' when the vehicle is disengaged, and the raising of it into that position sets the index to zero by lifting the arm J (pivoted to the same center as the lever D) into the position shown in dotted lines at J', Fig. 2, thus raising the lever $x$ (with its arms E', carrying the rollers E) into the position shown in dotted lines at $x'$ and E$^2$, so as to bring the rollers E into contact with the heart-shaped cam F, Fig. 2, and snail F', Fig. 5, which cams carry the hands of the dial or index A. At the same time the raising of the lever $x$ draws up the chain I, which is attached to it, and passes over rollers at G$^6$, and also around the pulley G$^2$, so that the raising of the chain revolves the pulley G$^2$, which is fixed on the spindle G$^4$, on which spindle is fixed the cog-wheel G$^3$, which works into the pinion G$^5$ on the shaft G', which carries the upper rollers H H', and by thus revolving the upper rollers the lower rollers are also revolved by means of the tapes upon them, and a spring in the case G is thereby wound up. The rollers are held in check by a ratchet Z' on the roller H and pawl or click attached to the cog-wheel H$^2$, which gears into the escape-pinion G$^7$ on the shaft Q, which carries the escape-wheel $a^3$, having near its circumference pins $a$ $a'$, projecting on each side, one or other of which pins rests on the pallets $y$, attached to the lever S, and the escape-wheel is thus held until the moving of the pallet $y$ by the raising of the lever S allows the pin to pass. Lowering the lever to the position shown at D on the drawings turns the arm J into the position shown in Figs. 2 and 5 and allows the lever $x$ to fall from the position shown, and thereby slacken the chain I, attached to it, and thus sets the spring in case G free for action, and the falling of the lever $x$ also releases the cams F F' and leaves the clockwork free. Placing the lever D into the upright position D' draws the slide K, Fig. 3, into a central position by means of a chain or wire L on a drum M, which is attached to the same spindle M' to which the lever D is keyed and turns with it. To this slide is attached an arm K$^2$, which passes to the front and carries the slide or shutter for opening and closing the wickets B and C, and when the slide K is in the central position, caused by placing the lever D upright, as above stated, the wickets are closed. At the same time bringing the lever D to this upright position throws the idle-wheel N out of gear, as shown in Fig. 4, this idle-wheel N being for the purpose of gearing into the wheels P or T for bringing into action the fare-indicator for time or for distance, as desired. When the lever D is brought into the position as shown in full line in Figs. 2 and 5, it moves the slide K, Fig. 3, to the one side, and thus opens the time-wicket B, Fig. 1. This movement of the slide K acts upon the central lever R, Fig. 2, the lower end of which, R', lies in the groove K', Figs. 2 and 3. The lever R, being pivoted at R$^2$, is thus tilted, as shown in Figs. 2 and 5, by reason of the slide K coming in contact with the lower end of the lever R at R', and this tilting action throws the idle-wheel N, which is pivoted at the top of the lever R, into gear with the minute-wheel P of the clock, as shown in Fig. 2, to indicate time, N being always in gear with the spindle of the minute-hand. When the clockwork has thus been brought into action and has performed the first half-hour, the lever S is raised by one of two pins 9, Fig. 5, borne upon the inner cam or snail F'. This raising of the lever S releases the escapement by allowing one of the two pins $a$ $a'$ on the escapement-wheel $a^3$ to pass, and thus freeing the escapement-wheel for one revolution allows the roller to turn sufficiently for the tape to indicate an increase of fare, and this is repeated every half-hour.

To bring the owner's registering-tapes O O' into gear, we employ the bar $c$, Figs. 2 and 5, which is brought into action by contact with the lever R by means of the studs or pins $d$ $d$. The end of the bar $c$ draws, by means of a spring 10, the clutch $w$ into contact with the teeth 11 on the upper rollers O, the clutch being squared to slide on the same spindle $H^3$ as the lower rollers H. The rollers O will then revolve with the rollers H. Fig. 5 shows the clutch in gear on the left hand and out of gear on the right hand. When the lever R is thrown to the opposite side for distance-fare indication, similar action takes place, causing the opposite rollers O' to revolve with the rollers H'. The owner's record is reset for applying a key to a square portion on the end of the spindle of the lower rollers O O' and winding the tapes from one roller O to the other roller O and from O' to O'.

For setting the apparatus to register fare by distance the lever D is brought over to the reverse side Z, bringing the idle-wheel N into gear with the mile-wheel T, thus throwing the action on the other side. (See Fig. 11.)

When about to start upon a journey, it is necessary to show in advance the fare due for the first hour of time or first mile of distance. This is done as follows: Lowering the lever D, as at Figs. 2 and 5, causes the slide K, Fig. 3, to travel from its central position in the direction shown in dotted line at $K^3$. When traveling, the pin $e$ upon it comes in contact with the lever Y in passing. The lever Y being thus raised lifts the lever V' by means of the stud $e'$ on the arm $V^2$, this causing the arm $V^2$ of the lever V to come into contact with the pin $e^2$ on the lever S, Figs. 2, 3, and 5, and momentarily raising it releases the ratchet-wheel $a^3$ (see Figs. 2 and 3) and sets the rollers H in motion, as before described, and thus exposes the fare in advance for the first hour of a hire by time. The slide K having passed to the full distance for opening the time-wicket, as shown in dotted lines at $K^3$, the lever Y (then clear of the pin $e$) will fall, as shown in dotted lines, causing the lever V also to fall away from its momentary contact with the stud $e^2$ on the lever S. Bringing the lever D over to the opposite side of the machine, so as to move the slide K in the opposite direction for exposing the distance-wicket, brings the stud or pin $e$ in contact (in passing) with the arm $V^3$ and momentarily raising it brings about the same result for exposing the distance fare, as above described for the time-fare indication.

Figs. 7 and 8 illustrate the pneumatic pump, together with the method of actuating same, Fig. 7 being an end view and Fig. 8 a sectional view. The cam $h$, attached to the hub of one of the wheels of the vehicle, consists of a ring cut diagonally with the inclined face $i$, which in its revolution presses against the piston $j$ of the pneumatic pump. $j'$ is the leather cup of the piston, having behind it the spiral spring $k$ to keep it up to its position against the face $i\,i$ of the cam $h$. $j^2$ is an elongation of the piston-rod, adjusted to come into contact with and open the valve $l$ each time that the pressure of the cam $h$ drives the piston-rod $j$ forward. The air-chamber $j^3$ of the pneumatic pump is connected by the tube $m$ with an inflatable air-chamber $n$ within the case containing the clock mechanism. (See Figs. 3, 4, and 9.) The expansion of this inflatable air-chamber $n$, caused by the working of the air-pump, raises a lever $o$, as shown in Figs. 4 and 9. This lever $o$ carries a click $p$, which picks up one tooth of the wheel $q$ at every pulsation of the inflatable chamber $n$, the check-spring $r$ checking the return of the wheel $q$.

We will now describe the arrangement for allowing of the stoppage of the vehicle for five minutes during a journey in which it has been hired by distance and for setting the mechanism into gear for registering the additional fare due for hire while waiting beyond the five minutes of free time.

The idle-wheel N will be in gear with the distance-of-mile wheel T, as shown in the detail drawing, Fig. 6, and reference should also be had to Fig. 4, which shows both time and distance indication out of gear, and to Fig. 5, which shows the mechanism in gear for time fare. $s$ is an air-tube connecting the air-chamber $n$ with a second air-chamber $n'$, and $m$ is the tube for conducting the air from the air-pump to the air-chambers $n$ and $n'$ and may be connected to the tube $s$ or to one end, as shown in Fig. 3, or to the other, as in Fig. 4. The chamber $n'$ has an interior valve $n^3$ to prevent the air returning when it has become inflated at the first pulsation, and it remains inflated until the vehicle stops, when by the time five minutes have elapsed the air will all have escaped from this chamber $n'$ by means of the escape-tube $n^2$, allowing of the escape of air while no renewal of air is being supplied. The collapse of the air-chamber $n'$ causes the lever $t$ to fall, as shown in Fig. 6, from its position shown in Figs. 4 and 5 and by means of the arm $t'$ bring an idle-wheel N' into gear with the wheel $P^2$, which is upon the same pivot as the wheel P', (at $R^2$,) which carries the hands, and as doing this brings into gear the clock-movement, the wheel making four revolutions per hour, an increase of fare at the rate for four miles per hour is recorded, and until the restarting of the vehicle causes the first pulsation in the air-chamber $n'$ to bring the lever $t$ to the same position the recording of fare by distance is renewed through the medium of the wheel T. When the vehicle is disengaged and the lever D upright, a stud on the idle-wheel N presses on the end $t^2$ of the lever $t$ and throws the clock out of gear.

Figs. 9 and 10 illustrate the means of adjusting the mechanism to the various diameters of the wheels of vehicles, which consists in the use of two conical reversed rolls or cones 1 and 2, connected together by a band 3, the position of which is altered by a slide and screw 4 and 5 to increase or diminish the speed. The cones are fixed on spindles supported on the bracket 6. Cone 2 is connected with the ratchet-wheel $q$ and cone 1 has a pinion 7, which is geared into the mile-wheel T.

It will be understood that various modifications may be made in the details of construction of the described apparatus without departing from the spirit of the invention and that when it is desired to construct the apparatus for recording the fares by time only, distance only, proprietor's record only, or, in fact, omitting any one of the combined records it may be found necessary to slightly vary or modify the construction of the apparatus.

Having now described our invention, what we claim as new, and desire to secure by Letters Patent, is—

1. A fare-indicating apparatus for vehicles comprising a casing having time and distance exposing openings or wickets, belts or tapes carrying time and distance signs arranged to travel respectively in front of said wickets, a clock mechanism located in the casing, an operating mechanism arranged to be operated by the wheel of the vehicle, means for controlling the movement of the tapes, and shifting mechanism arranged to be shifted to connect either the clock mechanism or the wheel-operated mechanism with said controlling mechanism, substantially as described.

2. A fare-indicating apparatus comprising a casing having time and distance exposing openings or wickets, belts or tapes arranged to travel in rear of said openings, motor mechanism for driving said belts or tapes, controlling means for normally holding said motor mechanism stationary, clock mechanism located in the casing, mechanism operated by the wheel of the vehicle, and switch mechanism arranged to connect either the clock mechanism or the wheel-operated mechanism to the controlling mechanism whereby said tapes may be operated either by the wheel of the vehicle or by the clock mechanism, substantially as described.

3. In combination, the casing having time and distance exposing openings, the slide normally closing said openings, the time and distance tapes located in proximity to said openings, spring mechanism for operating said tapes simultaneously, controlling mechanism arranged to hold said tapes normally against movement, a clock mechanism and wheel-operated mechanism normally disconnected from said controlling mechanism, and shifting connecting means arranged to connect either the clock mechanism or wheel-operated mechanism with said controlling mechanism, and simultaneously shift the slide to open the corresponding exposing-opening, substantially as described.

4. In apparatus for indicating and recording fares for cabs and other vehicles the combination of the clockwork mechanism described, the lever R, the arm J, the lever $x$ the chain I, the tape-rollers H H' O O', the arms E' carrying the rollers E, all for the purpose of indicating the time the vehicle is occupied the distance traveled during such occupancy the fare to be paid and the total amount received during the day.

5. In combination, the casing having time and distance exposing openings, a pair of drums carrying a tape located in proximity to each opening, motor mechanisms for simultaneously operating said drums, a slide arranged to normally close both openings, a controlling-lever arranged to normally hold said drum against movement, a wheel journaled in the casing carrying projections arranged to operate said lever to release the drums, a wheel located in proximity to said first-named wheel with clock mechanism for driving it, a third wheel located in proximity to said wheels with driving connections to the wheel of the vehicle, an idler-wheel movable to place either said second or third wheels in gear with the first wheel, and a hand-lever with connections for simultaneously shifting said idler-wheel and the slide, substantially as described.

6. In combination the casing having exposing-openings, the spring-operated drums in proximity thereto carrying time and distance indicating tapes, the lever S arranged to hold said drums normally against movement, the clock mechanism and the wheel-driven mechanism, a wheel carrying projections designed to operate said lever to release the drums, shifting mechanism arranged to connect either the clock mechanism or the wheel-driven mechanism with said wheel carrying the projections, a slide normally closing both exposing-openings and arranged to be operated simultaneously with said shifting mechanism, and means operated by the movement of the slide for lifting said lever S to release the drums, substantially as described.

7. In a fare-recorder, a time-fare-indicating mechanism, a distance-fare-indicating mechanism, and means for automatically bringing the time-fare-indicating mechanism into action on the stoppage of the vehicle for a predetermined length of time, substantially as described.

In witness whereof we have hereunto set our hands in presence of two witnesses.

JAMES RIDGE.
THOMAS MUTTON.
HORACE EDWIN HUPTON.

Witnesses:
REGINALD A. RODGERS,
ERNEST H. KEMPE.